United States Patent
Andrews et al.

(10) Patent No.: US 12,422,375 B2
(45) Date of Patent: Sep. 23, 2025

(54) INSPECTION UNIT FOR CANS AND METHOD FOR DETERMINING THE QUALITY OF CANS

(71) Applicant: H&T Rechargeable Solutions GmbH, Marsberg (DE)

(72) Inventors: Mark Andrews, Sparks, NV (US); Dave Donegan, Reno, NV (US); Keith Scott, Reno, NV (US)

(73) Assignee: H&T RECHARGEABLE SOLUTIONS GMBH, Marsberg (DE)

( * ) Notice: Subject to any disclaimer, the term of this patent is extended or adjusted under 35 U.S.C. 154(b) by 0 days.

(21) Appl. No.: 18/701,751

(22) PCT Filed: Jun. 17, 2022

(86) PCT No.: PCT/EP2022/066565
§ 371 (c)(1),
(2) Date: Apr. 16, 2024

(87) PCT Pub. No.: WO2023/066532
PCT Pub. Date: Apr. 27, 2023

(65) Prior Publication Data
US 2024/0426764 A1    Dec. 26, 2024

Related U.S. Application Data

(60) Provisional application No. 63/256,739, filed on Oct. 18, 2021.

(51) Int. Cl.
*G01N 21/90* (2006.01)
*G01N 21/88* (2006.01)
*G01N 21/84* (2006.01)

(52) U.S. Cl.
CPC ....... *G01N 21/909* (2013.01); *G01N 21/8851* (2013.01); *G01N 2021/8411* (2013.01); *G01N 2021/845* (2013.01)

(58) Field of Classification Search
CPC ............. G01N 21/952; G01N 21/8851; G01N 21/909; G01N 2021/8887;
(Continued)

(56) References Cited

U.S. PATENT DOCUMENTS 2,989,019 A    6/1961   Van Sciver, II
11,673,166 B2 * 6/2023 Borrowman ....... G01N 15/0227
382/141
(Continued)

FOREIGN PATENT DOCUMENTS

| DE | 102016211910 A1 | 1/2018 |
| DE | 202021102389 U1 | 5/2021 |
| GB | 2528934 A | 2/2016 |

OTHER PUBLICATIONS

International Search Report and Written Opinion mailed Oct. 4, 2022 in corresponding PCT application No. PCT/EP2022/066565.

*Primary Examiner* — Joseph C Rodriguez
(74) *Attorney, Agent, or Firm* — Nields, Lemack & Frame, LLC

(57) ABSTRACT

An inspection unit for cans (11), in particular for metal cans used in metered dose inhalers or for the manufacture of batteries, comprising a visual inspection unit (9) comprising camera units (20), a conveying unit (8), wherein images of the individual cans are captureable by different camera units from different viewing angles, wherein the camera units each capture a plurality of cans simultaneously in an image comprising a plurality of image portions (24) including images of an outer surface portion of each of said plurality of cans from a different viewing angle, the image portions including images of outer side surface portions (22) and the outer bottom surface portion (19) of each can, the sum of the images of the outer side surface portions covering the entire (Continued)

outer side surface of the can; and a processing unit to process the captured images portions and to determine an inspection result.

21 Claims, 6 Drawing Sheets

(58) Field of Classification Search
CPC ..... G01N 2021/845; G01N 2021/8411; B65G 53/04; B65G 53/40
See application file for complete search history.

(56) References Cited

U.S. PATENT DOCUMENTS

| | | | |
|---|---|---|---|
| 12,158,433 B2* | 12/2024 | Laico | B29C 49/42065 |
| 2008/0131254 A1* | 6/2008 | Cope | G01N 1/28 |
| | | | 414/754 |
| 2008/0310674 A1* | 12/2008 | Modiano | G01N 21/6456 |
| | | | 382/100 |
| 2008/0317279 A1* | 12/2008 | Deppermann | G01N 1/04 |
| | | | 382/100 |
| 2014/0112558 A1 | 4/2014 | Bean et al. | |
| 2017/0124704 A1 | 5/2017 | Wu et al. | |
| 2019/0168434 A1 | 6/2019 | Kubalek et al. | |
| 2019/0299255 A1* | 10/2019 | Chaganti | G06F 18/2431 |
| 2020/0232908 A1 | 7/2020 | Chang et al. | |

\* cited by examiner

INSPECTION UNIT FOR CANS AND METHOD FOR DETERMINING THE QUALITY OF CANS

TECHNICAL FIELD

The invention relates to an inspection unit for determining the quality of cans, in particular metal cans used in metered dose inhalers or for the manufacture of batteries, and to a method for determining the quality of cans.

BACKGROUND OF THE INVENTION

High quality standards are set for the manufacture of metal can-shaped products in many areas, especially in battery production or in the medical sector. In the production of battery cans, for example, high surface quality and dimensional accuracy are required. Only battery cans that meet the specified dimensions after production ensure the technical functionality and safety of the final battery product. The medical industry has similar requirements. Cans that are further processed into cartridges for metered dose inhalers, for example, must meet high quality requirements to ensure the functionality and quality of the medical product.

The manufacturing of such cans, e.g. battery cans, is often accomplished by a batch and queue process in a production line including at least one deep drawing station to form a drawn battery can. Deep drawing is effected under use of at least one punch having projecting forming surfaces and of means stretching the sheet material across the punch while the latter is moved traversely to the material, in particular at least one die which receives the formed material. A typical deep drawing process is e.g. described in U.S. Pat. No. 2,989,019, which is herewith incorporated by reference.

As defined in industry norm DIN 8584, the deep drawing process is a forming process which occurs under a combination of tensile and compressive conditions. During the deep drawing the material undergoes high stress loads. Characteristic of deep drawing is the high pressure on the order of 100,000 pounds per square inch (psi) involved in the operation. To deal with such force and to avoid deformation of the punches and dies, a lubricant is used. Under such pressure, the drawing lubricant should cool the die and the article, provide boundary lubrication between the die and the article, prevent metal-to-metal adhesion or welding and cushion the die during the drawing operation.

In a subsequent stage the formed parts are moved to a washing and drying area to remove the drawing lubricant. After the above production step, the formed parts are often inspected to ensure they meet specified quality standards. Accuracy and a high material quality are becoming important for safety of in particular lithium-ion (Li-ion) batteries. Although the development standards for Li-ion batteries have been improving steadily in recent years, accidents such as explosions and fires are still caused by uncontrolled releases of the battery's chemically stored energy due to, e.g., mechanical damage and material defects. It is therefore important that the battery can is able to withstand high pressures without bursting in case of a battery malfunction. Typically, the level of quality is ensured through random sampling and manual inspection of the metal battery cans.

In the high productivity production lines of lithium-ion batteries of increasing size, however, random sampling is not sufficiently accurate and has created demand for the development of automated quality inspection units.

It is now common to use camera systems that visually inspect the surface area of the formed products. Through the comparison of a captured image with reference data, visual inspection systems are capable of detecting various flaws in material surfaces. However, in high accuracy manufacturing processes, material defects, such as fine pores or cuts, or inner structural material defects are often not detected and have a significant influence on the safety of the final battery, especially of lithium-ion batteries. In this regard, it is standard to visually inspect the cans by moving the cans past camera units while rotating them, whereby the camera visually captures the entire outer surface of the can. Then, the image data is compared with predetermined target data to determine the quality of the product. Another approach is to pass the cans past a series of camera units, which visually inspect a section of the cans in sequence. However, with regard to increasing production speeds and shorter production times in high productivity manufacturing lines, such inspection systems prove to be inefficient.

It is an object of the present invention to improve the quality inspection of cans in high productivity manufacturing lines so as to ensure that the cans be inspected in a fast and efficient manner.

SUMMARY OF THE INVENTION

The object of the invention is solved by an inspection unit as defined in the claims. Further and preferred embodiments of the present invention are disclosed in the following description and in the dependent claims.

According to the invention, the inspection unit for determining the quality of cans comprises a visual inspection unit. The visual inspection unit comprises a plurality of camera units that define a visual inspection area, e.g. through the entire field of view, which is composed of all fields of view of the camera units, in which the cans are visually inspected by the plurality of camera units, i.e., the plurality of camera units are concentrated on a visual inspection area and inspect all the cans within the entire field of view of all the camera units. A conveying unit is adapted to convey the cans through the visual inspection area for visual inspection.

The conveying unit and the camera units are coordinated, e.g. arranged, such that images of the individual cans are captureable in the visual inspection area by different camera units of the plurality of the camera units, e.g. by a subset of the plurality of camera units or by all of the plurality of camera units of the visual inspection unit, from different viewing angles, or, in other words, from different perspectives, e.g. by a spatial distribution of the camera units. In an embodiment of the invention, the conveying unit and the plurality camera units are coordinated such that images of the individual cans are captureable in the visual inspection area at the same time, i.e. simultaneously, by different camera units from different viewing angles. Further, the conveying unit and the plurality of camera units are coordinated such that the plurality of camera units each capture a plurality of cans simultaneously in an image, i.e. a plurality of cans may be present within the field of view of the individual camera unit at the same time so that the camera unit can capture all cans within its field of view in an image, wherein each can in the image is captured from a different viewing angle due to the distribution of the cans within the field of view. The image comprises a plurality of image portions, the image portions including images of an outer surface portion of each of said plurality of cans in the image from a different viewing angle. In other words, each of said plurality of cans in the image has been captured, e.g.

photographed, and due to the distribution of the cans in the field of view of the camera unit from a different perspective and an outer surface section of each of said plurality of cans has been captured.

The image portions captured by said plurality of said camera units include images of outer side surface portions (i.e. outer jacket wall portions or outer sidewall portions) and the outer bottom surface portion of each of said plurality of cans, the sum of the images of the outer side surface portions covering the entire outer side surface of the can. Further, a processing unit is operatively coupled to the plurality of camera units and is configured to process the captured image portions for each of said plurality of cans and to determine an inspection result, wherein determining the inspection result comprises comparing image parameters to predetermined parameters.

In this way, the visual inspection of the outer surface of the cans is distributed among several camera units, i.e., a scan of the entire outer side surface (outer side wall surface) and the outer bottom surface of each can is obtained by using multiple camera units. This allows surface scanning that covers 100% of the outer sidewall and the outer bottom of each can. Even further, the individual camera units can visually inspect several cans simultaneously.

According to a further embodiment of the invention, the plurality of camera units is configured to capture multiple images of the plurality of cans as the cans are conveyed through the visual inspection area, since the conveying movement of the cans changes the angle of view of a camera unit on each of the plurality of cans. This allows a camera unit to capture different surface sections of a can.

The processing unit may be, for example, a microprocessor that receives the image data from the camera units. The processing unit may be configured to divide the single images provided by the camera units into individual image sections or portions based on fixed parameters. For example, the image portions may be predetermined sections within the image, predetermined by size and position, for example. The camera units are coordinated in such a way with regard to the conveying unit that a camera unit captures an image when the cans are in positions within the camera unit's field of view that correspond to the positions of the image portions of the image. In an embodiment of the invention, the processing unit is adapted to process the images of the camera units by means of software suitable for object recognition, whereby the software recognizes the individual cans within the image and then divides the image into subsections, i.e. image portions, whereby each subsection contains an image of a surface section of a can. Software that is already commercially available can be used for this purpose.

Comparison of the image data of the image portions with stored reference date may be achieved in many ways. For example, parameters may be assigned to each image in the image portions, such as grey scale values in predetermined locations, or contrast thresholds. The values are compared with stored reference values. The processing unit can thereby identify visual discrepancies and detect visual material defects, such as a scratches or the like. The visual inspection of the can from different viewing angels significantly improves speed and quality of the determination process.

The processing unit may be adapted to store the captured images required for evaluating a can until all the required images for the evaluation are available and then start the evaluation. However, the processing unit may also be adapted to perform an evaluation of the individual detected surface sections of the can while the inspection process is still ongoing.

The can has a cylindrical-shaped body with a peripheral side wall having an outer side wall surface (outer side surface, outer jacket wall surface), an opening (can opening) and a bottom from which the side wall extends. The opening of the can is with respect to the can bottom located at the opposite end of the can body. The side wall of the can may be cylindrical in shape. However, it is also possible to visually inspect cans with oblique or non-uniform sidewall sections.

According to a further embodiment of the invention, the conveying unit is provided in the form of a robot arm. According to a further embodiment of the invention, the conveying unit comprises a gripping mechanism configured to grip and hold a plurality of cans, e.g. in a hanging manner. The gripping mechanism may comprise a base element, e.g., a plate-like gripping unit, with a plurality of grippers, each configured to hold one or more cans. The gripping mechanism may be based on different principles. For example, the gripping mechanism may include gripper arms as grippers, wherein the gripper arms engage a can and hold the same by clamping. The gripping mechanism may also include vacuum grippers, which use a vacuum or suction cup to hold a can by means of negative pressure. Other gripping mechanisms, such as a magnetic gripper, are also conceivable.

According to a further embodiment of the invention, the gripping mechanism includes one or more light sources to illuminate at least part of the visual inspection area. According to yet a further embodiment, one or more lights sources are provided in the area of the cameras units and oriented in the viewing direction of the cameras units to illuminate the visual inspection area. According to a further embodiment of the invention, the plurality of camera units is surrounded by one or more light sources.

The visual inspection of the cans takes place when the cans are conveyed through the visual inspection area. In particular, according to a further embodiment of the invention, the visual inspection of the cans may place during a continuous conveying movement of the cans through the inspection unit. For example, the conveying unit may be configured to convey the cans through the visual inspection area in a nonstop manner. Alternatively, the conveying movement may take place step by step, which means that the cans are moved gradually though the visual inspection area.

According to a further embodiment of the invention, the processing unit is adapted to the process multiple images of a can (i.e. image portions) from different camera units from different viewing angles. In an embodiment of the invention, the processing unit is configured to process at least three images from each of three camera units. Thus, each can is captured by multiple camera units and the respective image portions are processed by the processing unit for evaluation.

According to a further embodiment of the invention, the visual inspection unit is adapted to inspect each can by processing images provided by at least three camera units.

According to yet a further embodiment of the invention, the processing unit is configured to process for each can at least nine image portions with images of outer surface portions of the can from different viewing angles.

According to a further embodiment of the invention, the plurality of camera units are arranged to have overlapping image areas.

According to a further embodiment of the invention, the processing unit is configured to generate on the basis of the images portions a stitched image of each can, and parameters of the resulting stitched image are compared by the processing unit with a predetermined set of parameters. The processing unit can thus create an overall image of the outer surface of the can, e.g. a virtual image of the entire outer surface of the can, from the individual images of the can in the image portions of the images captured by the plurality of camera units. This stitched image can be compared with default values for determining the quality of the surface and shape of the can.

According to a further embodiment of the invention, the camera units are arranged in an array formation, e.g. one-dimensional array arrangement, with adjacent camera units being aligned with one another along an axis perpendicular to the direction of the conveying movement of the conveying unit.

According to a further embodiment of the invention, the conveying unit is adapted to convey a plurality of cans in an array arrangement through the visual inspection area. For example, the cans may be arranged in a one-dimensional array that extends in the conveying direction, i.e., the cans are arranged one after the other in the conveying direction. The cans may also be arranged in a one-dimensional array that extends transverse to the conveying direction such that the cans in the array are conveyed into the visual inspection area together. The cans may also be conveyed by the conveying unit in a two-dimensional array arrangement, e.g. a matrix grid formation or checkerboard arrangement, through the visual inspection area, wherein the two-dimensional array arrangement comprises at least two rows of cans, wherein the rows each extend in a direction transverse to the direction of conveyance so that the cans in each row are conveyed simultaneously through the visual inspection area. A two-dimensional array arrangement basically comprises two or more one-dimensional arrays of cans.

According to a further embodiment of the invention, the conveying unit is adapted to convey the cans through the visual inspection area in an array arrangement, i.e. a one-dimensional array arrangement or a two-dimensional array arrangement (matrix formation), wherein in the array arrangement, the number of cans n in a row, e.g., in a direction perpendicular or transverse to the conveying direction, is defined by $n \geq 1$ and the number of camera units m for inspecting said cans is $m=n+2$.

By arranging the cans in an array or matrix formation, each of the camera units, e.g. arranged in array formation, may inspect each of the cans in its field of view from different perspectives as the array or matrix formation of cans is passing by, wherein the single camera unit captures multiple images of a can as said can is passing by and occupies different positions within the field of view of the camera unit during the conveying movement.

According to a further embodiment of the invention, the cans are conveyed through the visual inspection area in a hanging manner. It is also conceivable to convey the cans with the can opening oriented upwardly or aligned horizontally, as long as the camera units are aligned in such a way that the relevant sections of the cans can be captured as explained above.

According to a further embodiment of the invention, the camera units are located below the path of motion of the conveying unit such that the camera units can visually inspect the cans from below.

According to a further embodiment of the invention, the inspection unit comprises a tube assembly with a plurality of tubes and a tray, wherein the conveying unit is adapted to convey the cans into the tubes after visual inspection, i.e. after passing the visual inspection area, in such a way that the tubes receive one can each, wherein the tubes are adapted to guide the cans onto the tray by gravity, and wherein the tubes are at least partially inclined in the direction of fall so that the distance between adjacent cans on the tray is smaller than on the conveying unit. In this way, the cans are brought closer together as they are guided through the tubes and are then closely spaced arranged on the tray after visual inspection. The spatial reduction of the distance between the cans after the visual inspection allows an effective visual inspection, but at the same time provides a space-saving and compact onward transport of the inspected cans.

According to a further embodiment of the invention, the inspection unit is adapted to shift the tray relative to the tube assembly after a first filling operation to place cans in a second filling operation between cans placed during the first filling operation. The shifting of the tray between a first filling operation, in which cans fall onto the tray through the tube assembly, and a second filling operation, in which cans fall onto the tray through the tube assembly, allows an even more compact arrangement of the cans on the tray. In this embodiment, filling of the tray may be performed in multiple filling operations, for example, two, three, four or more filling operations. Depending on the size of the trays, the number of filling operations can vary. An essential aspect of this embodiment is that the tray is shifted between two subsequent filling operations in order to make optimum use of the free space between previously deposited cans.

According to a further embodiment of the invention, the inspection unit comprises a discard device configured to isolate cans based on the inspection result, wherein the discard device is operatively coupled to the processing unit. Cans that do not meet the quality requirements may be removed.

According to a further embodiment of the invention, the inspection unit comprises one of more further camera inspection units configured to inspect the inner surface and/or the edge section of the can opening. For example, one further camera inspection unit comprising one or more cameras units may be configured to inspect the inner surface, e.g. the inner bottom surface and the inner sidewall surface, of the cans and another further camera inspection unit comprising one or more camera units may be configured to inspect the edge section (i.e., the clipping edge) at the can opening of the cans. According to a further embodiment of the invention, one further camera inspection unit may be configured to provide both functions, i.e., to inspect the inner surface and/or the edge section of the can opening. The one or more further camera inspection units are operatively coupled to a processing unit for evaluation of the scanned cans. The discard device may remove cans from the process if the cans fail the inspection by the camera inspection unit.

The invention also relates to a method for determining the quality of cans in a production line. All aspects described herein with respect to the inspection unit can be implemented within the scope of the method. In particular, a method for determining the quality of cans includes conveying the cans with a conveying unit through a visual inspection unit comprising a plurality of camera units defining a visual inspection area in which the cans are inspected by the plurality of camera units, capturing images of each can in the visual inspection area by different camera units of the plurality of the camera units from different viewing angles when the cans are conveyed through the visual inspection area, wherein the conveying unit and the plurality of camera units are coordinated such that the plurality of camera units each capture a plurality of cans simultaneously in an image, the image comprising a plurality of image portions, the image portions including images of an outer surface portion of each of said plurality of cans from a different viewing angle, wherein the image portions captured by said plurality of said camera units include images of outer side surface portions and the outer bottom surface portion of each of said plurality of cans, the sum of the images of the outer side surface portions covering the entire outer side surface of the can, and processing by means of a processing unit that is operatively coupled to the plurality of camera units the captured image portions for each of said plurality of cans and determining by means of the processing unit an inspection result, wherein determining the inspection result comprises comparing image parameters to predetermined parameters.

According to a further embodiment of the invention, the method includes the step of removing battery cans from the production line that do not fulfill predetermined quality requirements.

According to a further embodiment of the invention, images of the individual cans are captured in the visual inspection unit by different camera units from different viewing angles simultaneously.

According to a further embodiment of the invention, the processing unit processes multiple images of a can from different camera units. According to a further embodiment of the invention, each can is visually inspected by at least three camera units.

According to a further embodiment of the invention, for each can at least nine image portions with images of outer surface portions of the can from different viewing angles are processed for evaluation.

According to a further embodiment of the invention, a stitched image is generated for each can on the basis of the images portions, and parameters of the resulting stitched image are compared with a predetermined set of parameters.

According to a further embodiment of the invention, each can is visually inspected by at least three camera units.

According to a further embodiment of the invention, visual inspection of the cans takes place during a continuous conveying movement of the cans through the visual inspection area.

According to a further embodiment of the invention, the cans are conveyed in a checkerboard arrangement through the visual inspection area. In an embodiment, the cans are conveyed in a checkerboard arrangement through the visual inspection area in a hanging manner.

According to a further embodiment of the invention, the method further includes conveying the cans through one or more further camera inspection units that are configured to inspect the inner surface of the can and/or the edge section of the opening of the cans; and passing the images of the cans captured by the one or more further camera inspection units to a processing unit to determine an inspection result. Determining the inspection result may comprise comparing image parameters to predetermined parameters.

BRIEF DESCRIPTION OF THE FIGURES

The invention will now be described referring to an exemplary embodiment shown in the Figures in which:

FIG. 1 shows an isometric view of an inspection unit 1 for cylindrical metal cans for the manufacture of batteries in accordance with a first embodiment of the invention. The inspection unit 1 is integrated in a production line for battery cans.

Figure 1:
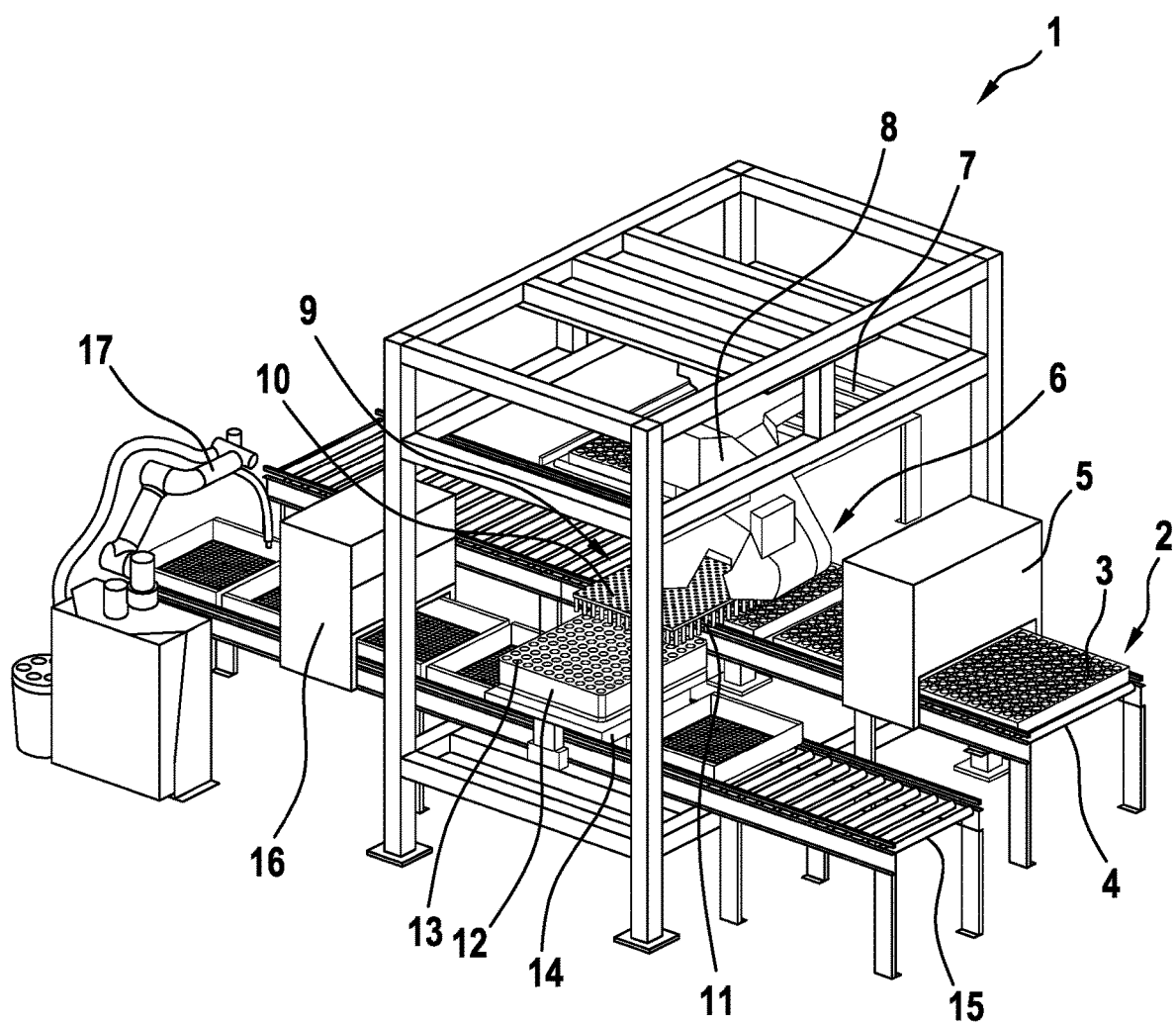
FIG. 1 shows in an isometric view of an inspection unit according to one embodiment of the invention.

The inspection unit 1 comprises several stations, namely an input station 2 in which battery cans on a first tray 3 are put onto a conveyor line 4. The first tray 3 with the cans then passes through an initial camera inspection unit 5 to detect first damages of the cans and inspect the clip opening.

After the initial camera inspection unit 5, the cans are then moved on to a pickup station 6. If the initial inspection requirements are not met, the first tray 3 passes the pickup station 6 and continues to a removal area 7 where the first tray 3 is removed from the process.

If the first inspection requirements are met, a conveying unit 8 in the form of a robot arm conveys the cans through a visual inspection unit 9, in which the outer side surface (i.e. the outer side wall surface) and the outer bottom surface of the cans are visually inspected to determine the quality of the cans. The robot arm 8 comprises a plate-like gripping unit 10. The gripping unit 10 comprises a plurality of individual grippers each adapted to grip a single can on the first tray 3. By means of the grippers, the cans on the first tray 3 are lifted out of the first tray 3. When the cans 11 are lifted from the first tray 3, they are guided through the visual inspection unit 9 for visual inspection in a manner suspended from the gripping unit 10. In this process, the outer bottom surface of the cans 11 is oriented downward.

After passing the gripping unit 10 through the visual inspection unit 9, the robot arm 8 moves the gripping unit 10 with the cans 11 hanging down from the gripping unit 10 over a tube assembly 12. There, the cans 11 are lowered into openings 13 of tubes of the tube assembly 12 leading downward. The cans 11 pass downwardly through the tubes onto a second tray 14, which has previously been moved under the tube assembly 12 on a conveyor line 15.

When the second tray 14 is filled with cans 11, with the can openings being oriented upward, the second tray 14 is passed through a final camera inspection unit 16 which by means of cameras mounted therein visually inspects the inside of the cans and/or the clip opening or the edge of the can opening.

After passing the final camera inspection unit 16, the tray passes a rejection unit 17, which removes cans that fail to meet the quality requirements of the visual inspection unit or the final camera inspection unit from the second tray 14 and, thus, from the production process.

Figure 2:
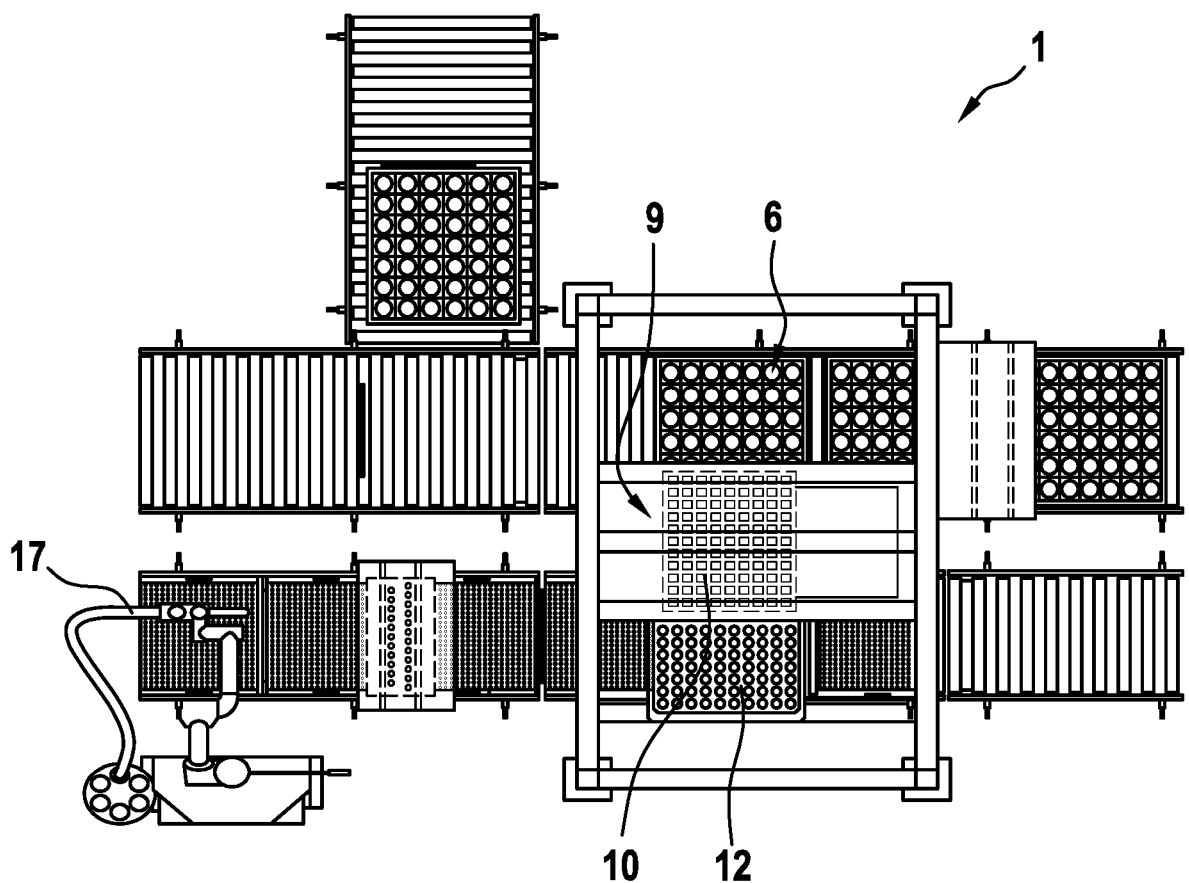
FIG. 2 shows in a top view the inspection unit of FIG. 1.

FIG. 2 shows a top view of the inspection unit 1. Starting from the pickup station 6, the cans are conveyed by means of the conveying unit 8 through the visual inspection unit 9 while being suspended from the gripping unit 10. In doing so, the cans are guided over camera units arranged in the visual inspection unit 9 below the path of movement of the gripping unit 10. The camera units capture images of the hanging down cans from below for visual inspection. In this process, the camera units take different images of each can and a processing unit operatively coupled to the camera units compares the image data with predetermined parameters. Cans for which the images do not meet the criteria are marked as rejects and removed from the production process in the further course, e.g. by means of the rejection unit 17. After passing the camera units, the cans are lowered into the tube assembly 12 as explained above.

Figure 3:
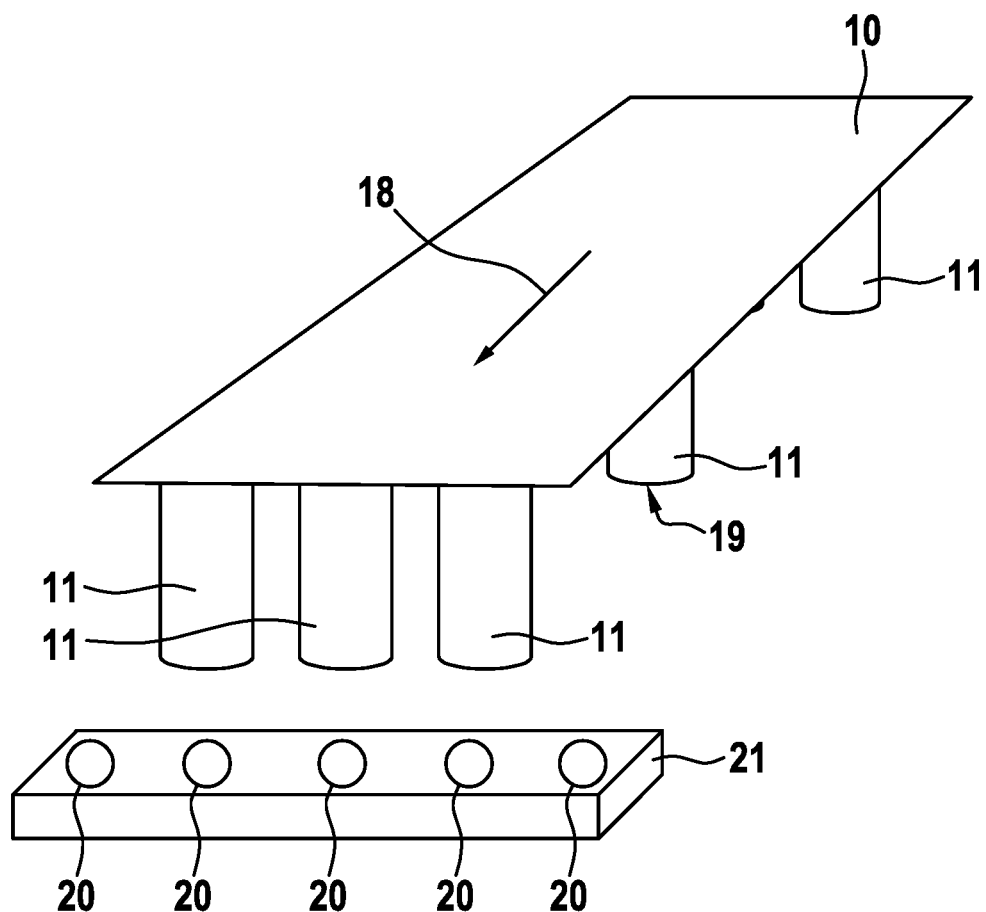
FIG. 3 shows schematically details of the inspection unit of FIG. 1.

FIG. 3 shows schematically the gripping unit 10 as it is passed through the visual inspection unit along a conveying direction 18 by the conveying unit, i.e., the robot arm. The cans 11 are transported in a hanging manner, i.e. the cans 11 hang down from the bottom of the gripping unit 10. The outer bottom surface 19 of the cans 11, i.e. the closed end of the cans 11, is oriented downwards.

In the visual inspection unit, a plurality of camera units 20 is arranged in an array formation 21, with adjacent camera units 20 being aligned with one another along an axis perpendicular to the direction of the conveying movement, i.e. the conveying direction 18, of the conveying unit. The camera units 20 are oriented upward to capture images of the can arrangement from below. During visual inspection, the gripping unit 10 is continuously passed over the camera units 20, i.e. every single can is passed over the array 21 of camera units.

Figure 4:
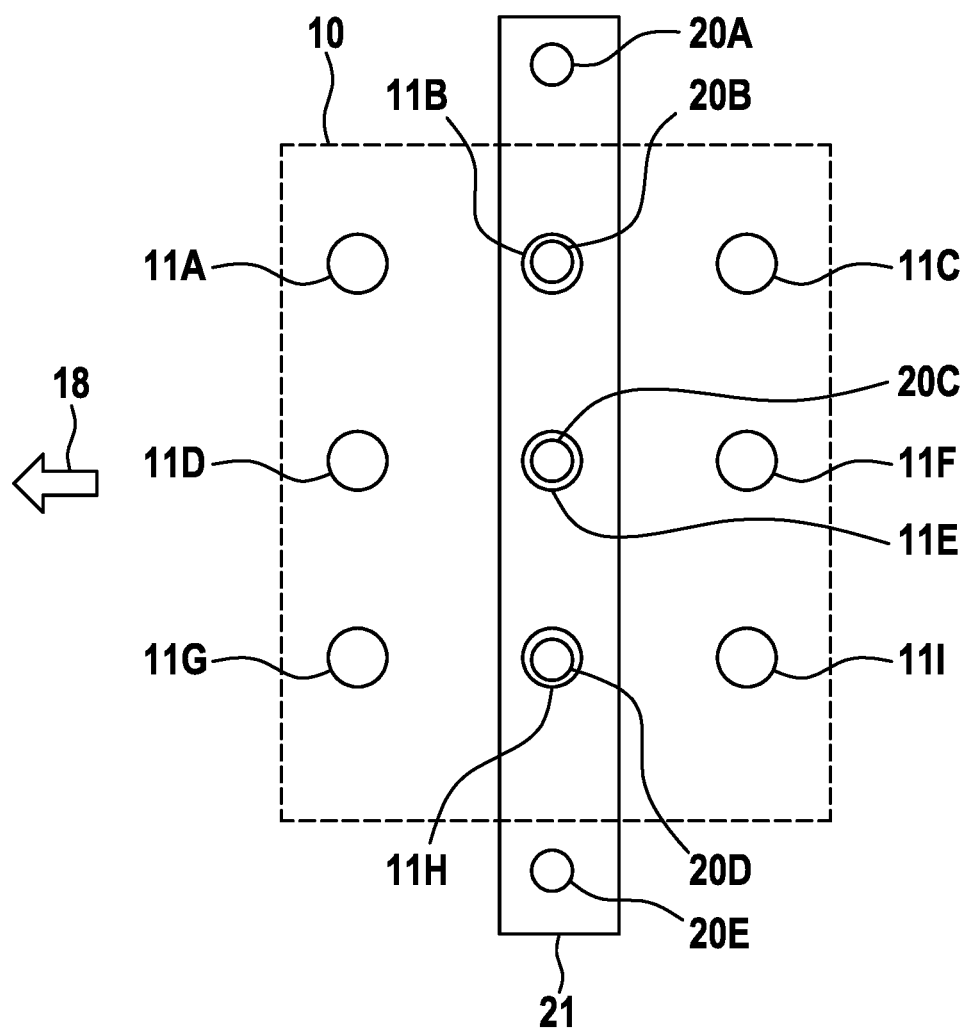
FIG. 4 shows schematically details of the inspection unit of FIG. 1.

FIG. 4 shows schematically in a top view how the gripping unit 10 is guided over the array 21 of camera units (here divided into camera units 20A to 20E) in the conveying direction 18. The camera units 20A to 20E are arranged in series and perpendicular to the conveying direction 18. The camera units 20A to 20E define a visual inspection area in which the cans 11 (here marked as cans 11A to 11I) are visually inspected.

The cans 11 are arranged in a checkerboard or matrix arrangement on the gripping unit 10. The gripping unit 10 moves over the array 21 of camera units at a distance from the camera units. In the example in FIG. 4, the number of cans n in a row, i.e., in a direction transverse to the conveying direction 18, is three, while the number of cameras units m for inspecting the three cans in a row is five. This ratio is based on the equation m=n+2, which has proven to be advantageous for array and matrix arrangements of cans.

The arrangement of the camera units 20 and the cans 11 on the gripping unit 10 is coordinated in such a way that images of the individual cans can be captured in the visual inspection area by different camera units from different viewing angles, or, in other words, from different perspectives. This is exemplified in FIG. 5.

Figure 5:
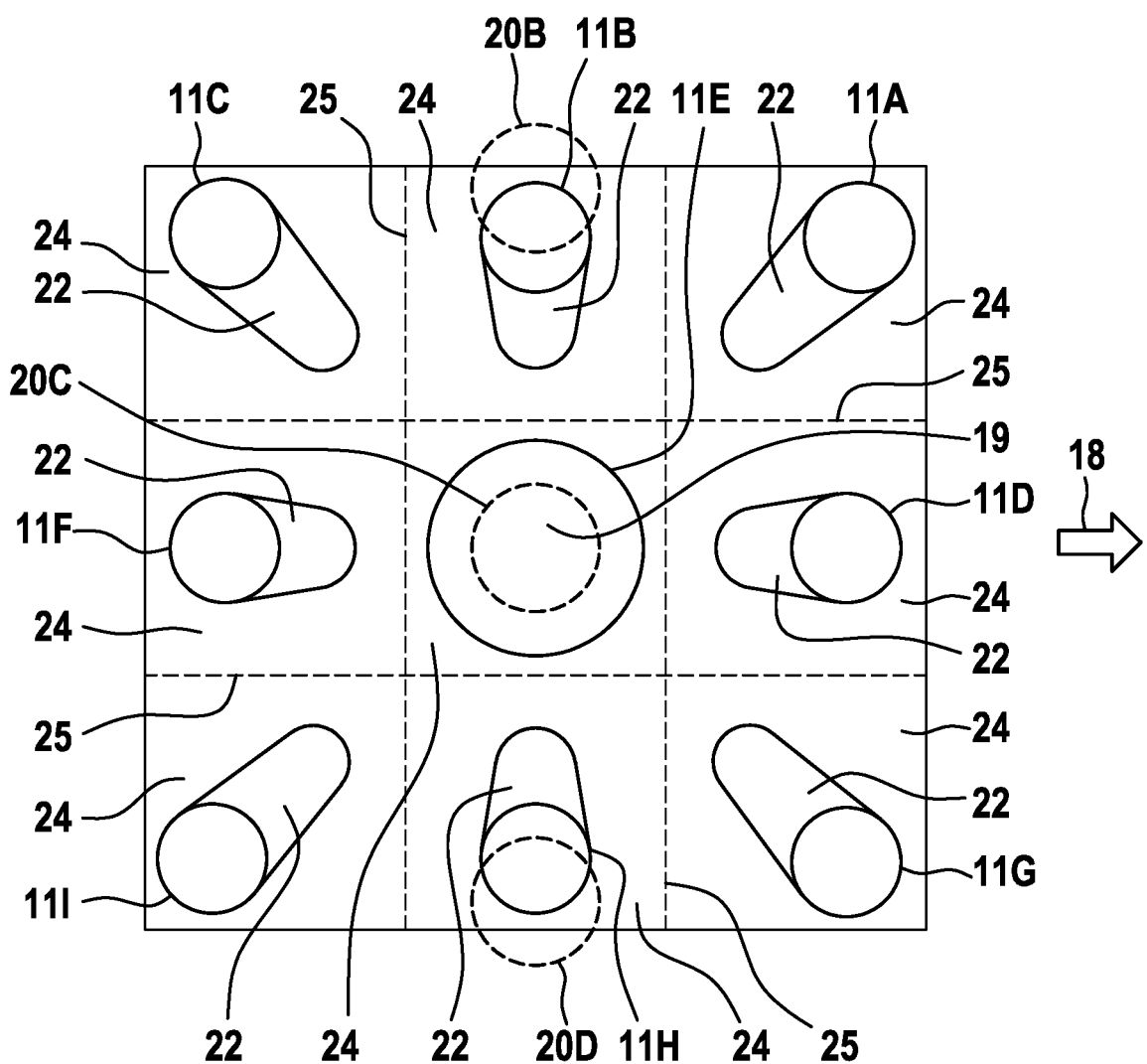
FIG. 5 shows schematically the field of view a camera unit of the inspection unit of FIG. 1.

FIG. 5 illustrates the field of view of camera unit 20C of FIG. 4 from underneath the gripping unit.

Camera unit 20C (marked with dashed line circle) capture an image with nine cans 11A to 11I on the gripping unit 10 at the same time within its field of view, whereby the central can 11E is located with its outer bottom surface 19 directly above camera unit 20C in the state shown. In the same way, can 11B is located directly above camera unit 20B (the relative position of camera unit 20B is indicated with dashed line circle), which means that camera unit 20B has a direct view of the outer bottom surface of can 11B. In the same way, can 11H is located directly above camera unit 20D (the relative position of camera unit 20D is indicated with dashed line circle), which means that camera unit 20D has a direct view of the outer bottom surface of the can 11H.

The camera units 20B and 20D have a comparable field of view size as camera unit 20C. This means that adjacent camera units of the array of camera units have overlapping image areas. As a result, images of the individual cans are captureable in the visual inspection area by different camera units from different viewing angles simultaneously. While cans 11A to 11I are within the field of view of camera unit 20C, cans 11A, 11B, 11C, 11D, 11E and 11F are also in the field of view camera unit 20B. In the same way, cans 11D, 11E, 11F, 11G, 11H and 11I are also in the field of view camera unit 20D.

This means that a plurality of camera units each capture a plurality of cans 11 simultaneously in an image, e.g. images with cans 11A, 11B, 11C, 11D, 11E and 11F in the images can be captured by camera units 20B and 20C simultaneously and images with cans 11D, 11E, 11F, 11G, 11H and 11I in the images can be captured by camera units 20C and 20D simultaneously. Even further, cans 11D, 11E and 11F are each within the field of view of camera units 20B, 20C and 20D. In the same way, cans 11A, 11B and 11B are each within the field of view of camera units 20A, 20B and 20C (see FIG. 4). In the same way, cans 11G, 11G and 11I are each within the field of view of camera units 20C, 20D and 20E (see FIG. 4).

The image captured by camera unit 20C as shown in FIG. 5 comprises a plurality of image portions 24, i.e., the image captured by camera unit 20C may be divided into image portions 24 (the division of the image into image portions is indicated by dashed lines 25), wherein the division of the image into the image portions is such that each image portion 24 includes an image of an outer surface portion of a can. As evident from FIG. 5, the image portions of the image captured by camera unit 20C include images of an outer side surface portion 22 of cans 11A, 11B, 11C, 11D, 11F, 11G, 11H, 11I) and the outer bottom surface portion 19 of can 11E. In a similar manner, the image portions of the image captured by camera unit 20B in the state shown in FIG. 5 include images of an outer side surface portion 22 of cans 11A, 11C, 11D, 11E and 11F and the outer bottom surface portion 19 of can 11B. In a similar manner, the image portions of the image captured by camera unit 20D in the state shown in FIG. 5 include images of an outer side surface portion 22 of cans 11D, 11E, 11F, 11G and 11I and the outer bottom surface portion 19 of can 11H.

When the gripping unit 10 is moved in conveying direction 18, can 11F moves to the location of can 11E shown in FIG. 5 relative to camera unit 20C so that the outer bottom surface portion of can 11F is located directly above camera unit 20C, i.e., the position of can 11E in FIG. 5. Can 11E is then in the position of can 11D. Further conveying movement of the cans in conveying direction 18 moves can 11F into the position of can 11D in FIG. 5. Thus, camera unit 20C can capture each of cans 11D, 11E and 11F in three different positions, i.e. from three different perspectives.

Since the row of cans 11D, 11E, 11F is also in the field of view of the camera unit 20B, these three cans are also captured by the camera unit 20B from three different angles of view, respectively, during the conveying motion.

Further, since the row of cans 11D, 11E, 11F is also in the field of view of the camera unit 20D, these three cans are also captured by the camera unit 20D from three different angles of view, respectively, during the conveying motion.

This means that for each of cans 11D, 11E, 11F, the camera units 20B, 20C and 20D may provide nine images in total, wherein each image comprises an image portion with an image of an outer surface portion of each of the cans 11D, 11E, 11F from a different perspective. In detail, the image portions provided by camera units 20B, 20C and 20D include images of the outer bottom surface portion and outer side surface portions of the cans 11D, 11E and 11F, wherein the sum of the images of the outer side surface portions cover the entire outer side surface of the respective can.

In a similar manner, the images provided by camera units 20C, 20D and 20E include nine images with image portions including images of the outer side surface portions and the outer bottom surface portion of the cans 11G, 11H and 11I, the sum of the images of the outer side surface portions covering the entire outer side surface of each of cans 11G, 11H ad 11I.

In a similar manner, the images provided by camera units 20A, 20B and 20C include nine images with image portions including images of the outer side surface portions and the outer bottom surface portion of the cans 11A, 11B and 11C, the sum of the images of the outer side surface portions covering the entire outer side surface of each of cans 11A, 11B, and 11C.

The images captured by the camera units are forwarded to and processed by the processing unit. The processing unit processes the single images and isolates the cans within the image, e.g. the processing unit subdivides the image into several image portions and then assigns the image portions of the image to the corresponding can. The processing unit then processes the image portions for each can for evaluation, wherein in the described embodiment, nine image portions are processed for each can, with each image portion showing the can from a different perspective. The processing unit generates for each can on the basis of the image portions a stitched image that covers the entire outer side surface and the outer bottom surface of the can. Parameters of the resulting stitched image are compared by the processing unit with a predetermined set of parameters, e.g. default values for determining the quality of the surface and shape of the can. For example, parameters may be assigned to each stitched image, such as grey scale values in predetermined locations, or contrast thresholds. The values are compared with stored reference values. The processing unit can thereby identify visual discrepancies and detect visual material defects, such as a scratches or the like.

Figure 6:
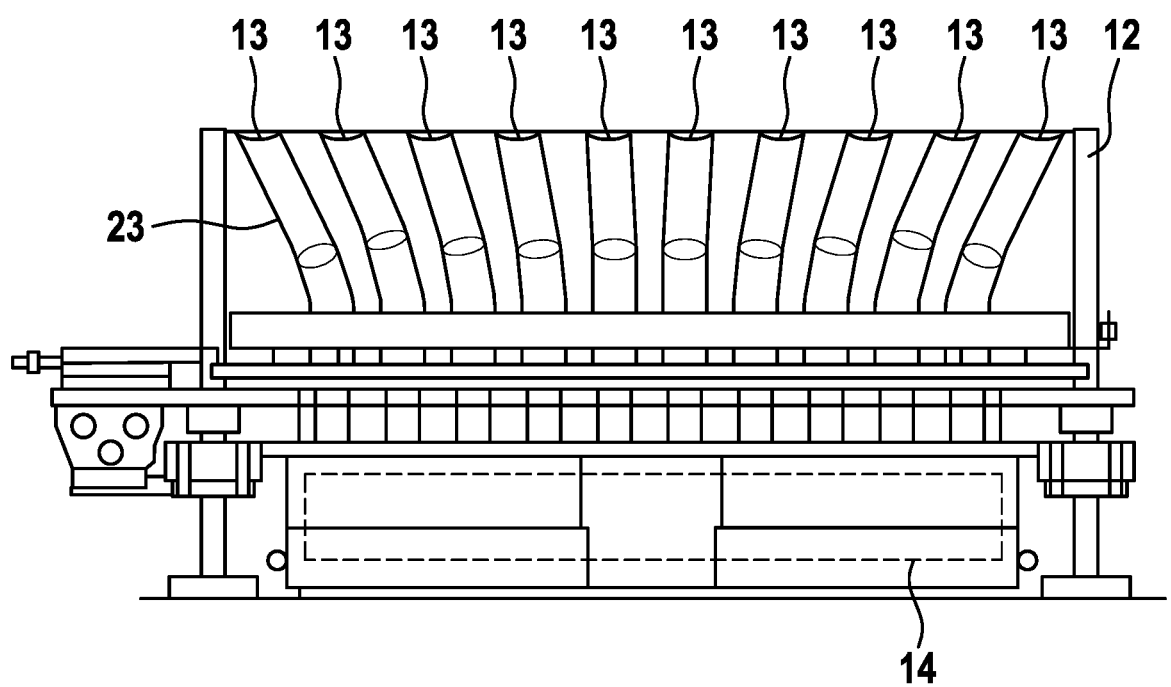
FIG. 6 shows in a side view details of the inspection unit of FIG. 1.

FIG. 6 shows the tube assembly 12 of the inspection unit 1. The tube assembly 12 includes a plurality of tubes 23 whose openings 13 are oriented upwards to receive the cans from the conveying unit.

After the visual inspection of the cans in the visual inspection unit is completed, the cans are lowered into the tube arrangement 12, wherein each tube opening 13 receives one can, and the cans slide down the tubes 23 onto an empty second tray 14 by gravity. As evident from FIG. 6, the tubes are partially inclined in the direction of fall, so that the distance between adjacent cans becomes smaller and the cans move closer together on the way down and stand closer together on the second tray 14.

When the second tray 14 is filled with cans in a first filling operation, i.e., the previously empty second tray 14 has received cans, the inspection unit shifts the second tray 14 relative to the tube assembly 12 horizontally. When the conveying unit conveys another set of cans through the visual inspection unit and lowers the cans into the tubes in a second filling operation of the second tray 14, these cans fall between the cans placed on the second tray 14 in the first filling operation. A compact and effective arrangement of the cans on the second tray 14 is achieved.

The filled second tray 14 is then passed through the final camera inspection unit. Cans that do not meet the quality requirements of the visual inspection in the visual inspection unit or in the final camera inspection unit are then sorted out by the rejection unit 17.

REFERENCE NUMERALS 1 inspection unit
2 input station
3 first tray
4 conveyer line
5 initial camera inspection
6 pickup station
7 removal area
8 conveying unit
9 visual inspection unit
10 plate-like gripping unit
11 can
12 tube assembly
13 tube openings
14 second tray
15 conveyer line
16 final camera inspection unit
17 rejection unit
18 conveying direction
19 outer bottom surface of can
20 camera unit
21 array of camera units
22 side surface portion of can
23 tube
24 image portion
25 image portions division line

The invention claimed is:

1. An inspection unit for cans, comprising:

a visual inspection unit comprising a plurality of camera units which define a visual inspection area in which the cans are visually inspected by a plurality of camera units;

a conveying unit for conveying the cans through the visual inspection area, wherein the conveying unit and the plurality camera units are coordinated such that images of the individual cans are captureable in the visual inspection area by different camera units of the plurality of camera units from different viewing angles, and wherein the conveying unit and the plurality of camera units are coordinated such that the plurality of camera units each capture a plurality of cans simultaneously in an image, the image comprising a plurality of image portions, the image portions including images of an outer surface portion of each of said plurality of cans from a different viewing angle, wherein the image portions captured by said plurality of camera units include images of outer side surface portions and the outer bottom surface portion of each of said plurality of cans, the sum of the images of the outer side surface portions covering the entire outer side surface of the can; and a processing unit operatively coupled to the plurality of camera units, the processing unit configured to process the captured images portions for each of said plurality of cans and to determine an inspection result, wherein determining the inspection result comprises comparing image parameters to predetermined parameters;

a tube assembly with a plurality of tubes and a tray, wherein the conveying unit is adapted to convey the cans into the tubes after the visual inspection in such a way that the tubes receive one can each, wherein the tubes are adapted to guide the cans onto the tray by gravity, and wherein the tubes are at least partially inclined in the direction of fall so that the distance between adjacent cans on the tray is smaller than on the conveying unit; and wherein the inspection unit is adapted to shift the tray relative to the tube assembly after a first filling operation to place cans in a second filling operation between cans placed on the tray during the first filling operation.

2. The inspection unit according to claim 1, wherein the conveying unit and the plurality camera units are coordinated such that images of the individual cans are captureable in the visual inspection area at the same time by different camera units from different viewing angles.

3. The inspection unit according to claim 1, wherein the processing unit is adapted to process multiple images of a can from different camera units.

4. The inspection unit according to claim 1, wherein the processing unit is configured to process for each can at least nine image portions with images of outer surface portions of the can from different viewing angles.

5. The inspection unit according to claim 1, wherein the processing unit is configured to generate on the basis of the images portions a stitched image of each can, and parameters of the resulting stitched image are compared by the processing unit with a predetermined set of parameters.

6. The inspection unit according to claim 1, wherein the visual inspection unit is adapted to inspect each can by processing images captured by least three camera units.

7. The inspection unit according to claim 1, wherein the conveying unit is adapted to convey the cans through the visual inspection area in a continuous movement.

8. The inspection unit according to claim 1, wherein the camera units are arranged in an array formation, with adjacent camera units being aligned with one another along an axis perpendicular to the direction of the conveying movement of the conveying unit.

9. The inspection unit according to claim 1, wherein the conveying unit is adapted to convey the cans in an array or matrix arrangement through the visual inspection area.

10. The inspection unit according to claim 1, wherein the camera units are located below the path of motion of the conveying unit.

11. The inspection unit according to claim 1, further comprising one or more further camera inspection units configured to inspect the inner surface of the can and/or the edge section of the opening of the cans.

12. A method for determining the quality of cans in a production line, the method comprising:
conveying the cans with a conveying unit through a visual inspection unit comprising a plurality of camera units defining a visual inspection area in which the cans are inspected by the camera units;
capturing images of each can in the visual inspection area by different camera units of the plurality of the camera units from different viewing angles when the cans are conveyed though the visual inspection area, wherein the conveying unit and the plurality of camera units are coordinated such that the plurality of camera units each capture a plurality of cans simultaneously in an image, the image comprising a plurality of image portions, the image portions including images of an outer surface portion of each of said plurality of cans from a different viewing angle,
wherein the image portions captured by said plurality of said camera units include images of outer side surface portions and the outer bottom surface portion of each of said plurality of cans, the sum of the images of the outer side surface portions covering the entire outer side surface of the can; and
processing by means of a processing unit that is operatively coupled to the plurality of camera units the captured images portions for each of said plurality of cans and determining by means of the processing unit an inspection result, wherein determining the inspection result comprises comparing image parameters to predetermined parameters,
conveying the cans with the conveying unit to a tube assembly, the tube assembly comprising a plurality of tubes and a tray, wherein the conveying unit conveys the cans into the tubes after the visual inspection in such a way that the tubes receive one can each,
wherein the tubes guide the cans onto the tray by gravity, and wherein the tubes are at least partially inclined in the direction of fall so that the distance between adjacent cans on the tray is smaller than on the conveying unit.

13. The method according to claim 12, further including generating on the basis of the images portions a stitched image of each can comparing by means of the processing unit parameters of the resulting stitched image with a predetermined set of parameters.

14. The method according to claim 12, including the step of discarding cans that do not fulfill quality requirements.

15. The method according to claim 12, further comprising conveying the cans through one or more further camera inspection units that are configured to inspect the inner surface of the cans and/or the edge section of the opening of the cans; and
passing the images of the cans captured by the one or more further camera inspection units to a processing unit to determine an inspection result.

16. The inspection unit according to claim 2, wherein the processing unit is adapted to process multiple images of a can from different camera units.

17. The inspection unit according to claim 2, wherein the processing unit is configured to process for each can at least nine image portions with images of outer surface portions of the can from different viewing angles.

18. The inspection unit according to claim 3, wherein the processing unit is configured to process for each can at least nine image portions with images of outer surface portions of the can from different viewing angles.

19. The inspection unit according to claim 2, wherein the processing unit is configured to generate on the basis of the images portions a stitched image of each can, and parameters of the resulting stitched image are compared by the processing unit with a predetermined set of parameters.

20. The inspection unit of claim 1, wherein said cans are metal cans used in metered dose inhalers or for the manufacture of batteries.

21. The method of claim 12, wherein said cans are metal cans used in metered dose inhalers or for the manufacture of batteries.

* * * * *